CROSBY & KELLOGG.
Sewing Machine.
No. 36,074.
4 Sheets—Sheet 1.
Patented Aug. 5, 1862.
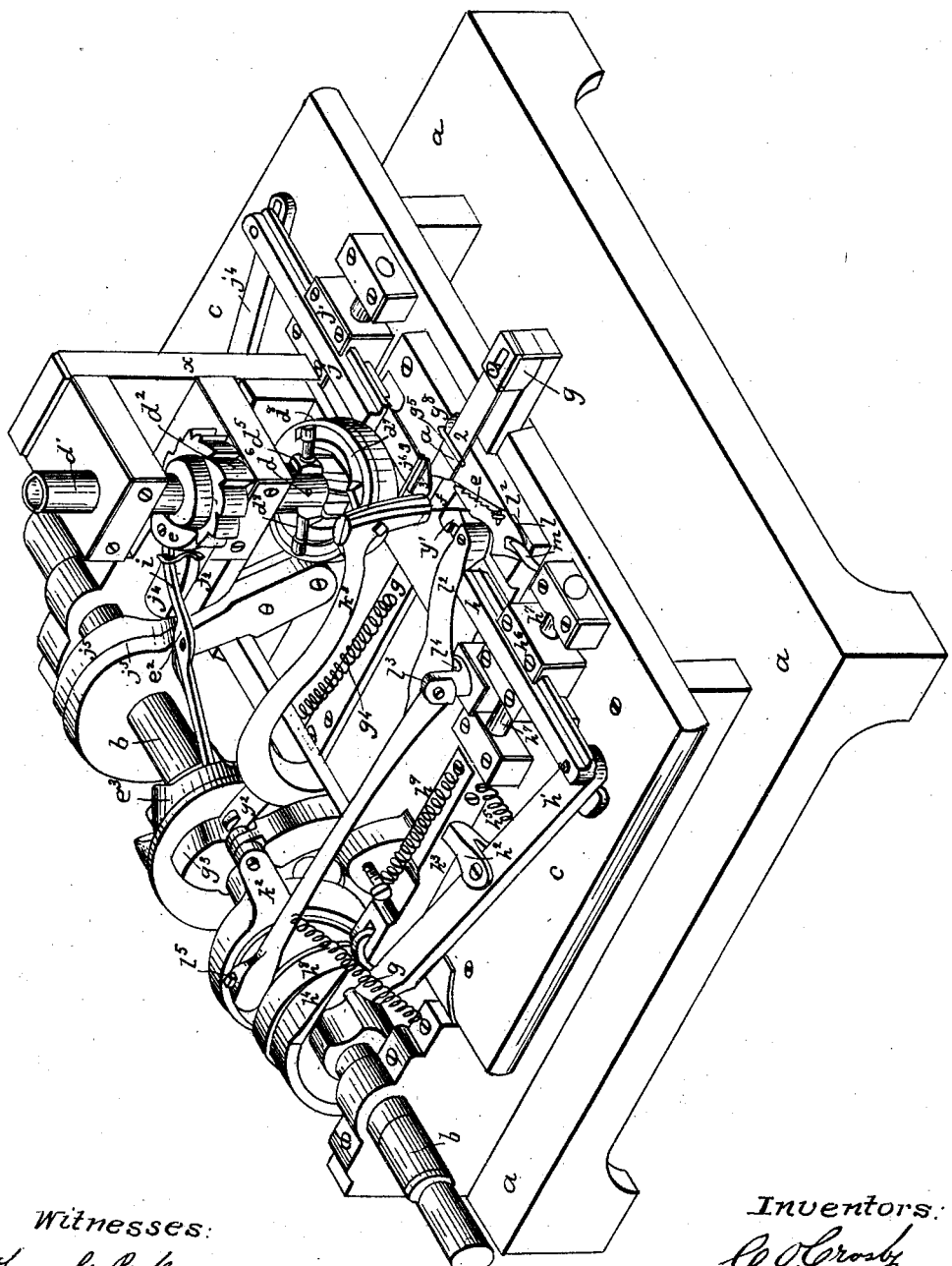
Witnesses:
Lucius G. Peck
Albert Sherman
Inventors:
C. O. Crosby
Henry Kellogg CROSBY & KELLOGG.
Sewing Machine.
No. 36,074. Patented Aug. 5, 1862.
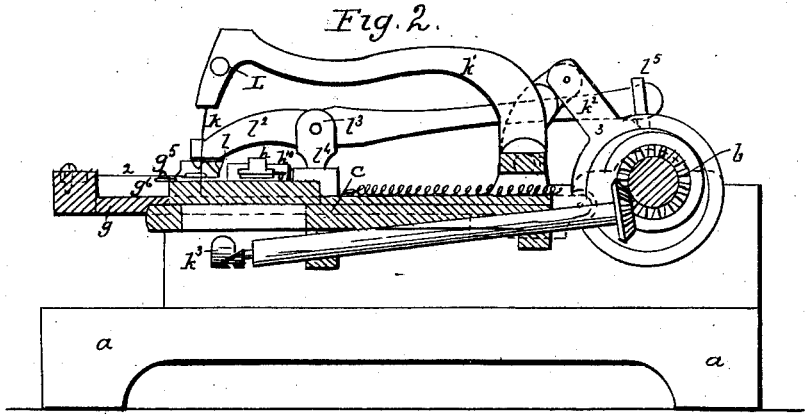
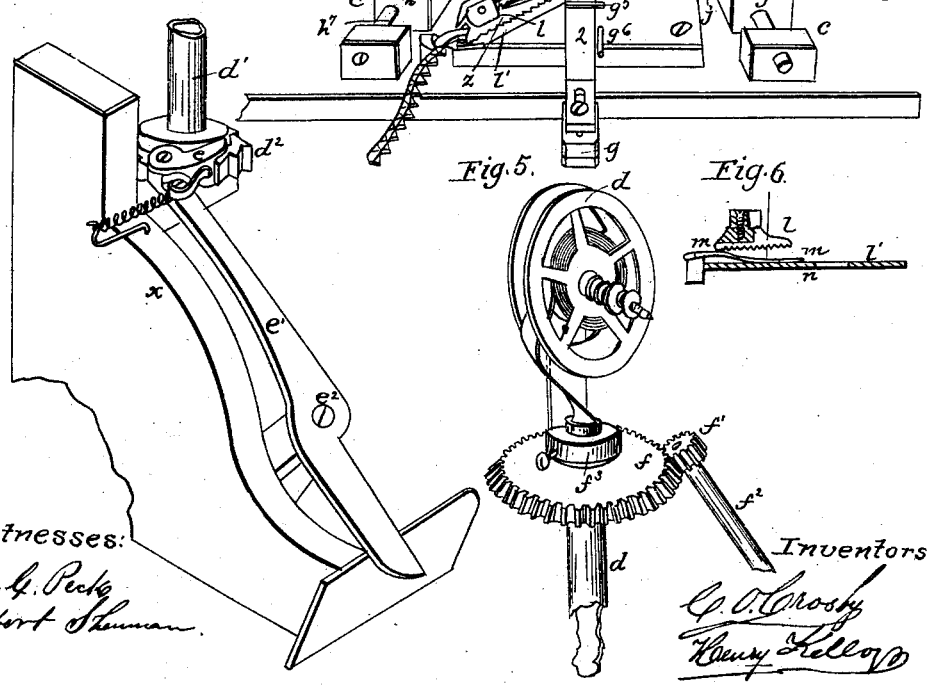

CROSBY & KELLOGG.
Sewing Machine.
No. 36,074.
4 Sheets—Sheet 3.
Patented Aug. 5, 1862.
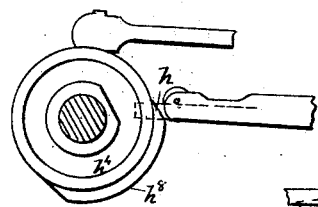
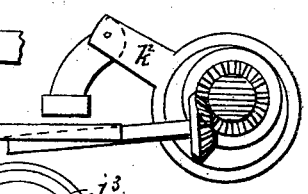
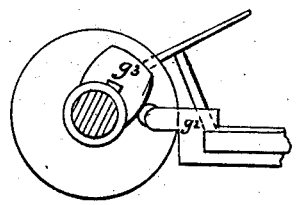
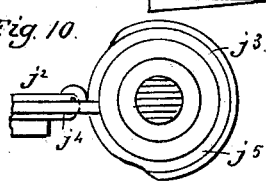
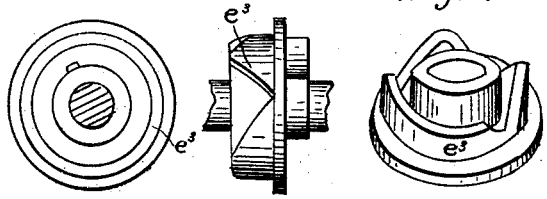
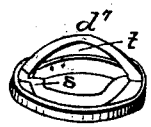
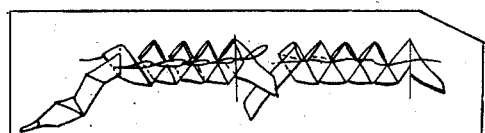
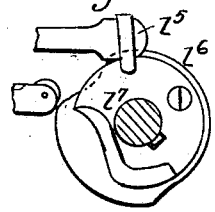
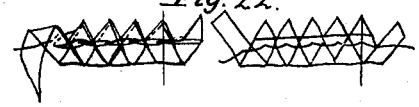
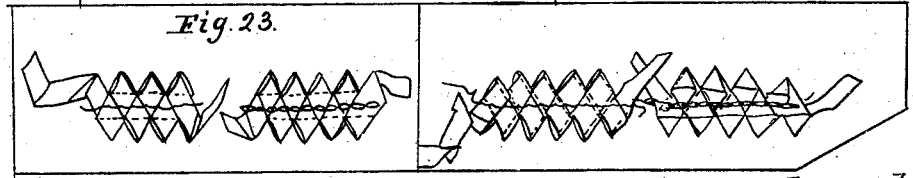

CROSBY & KELLOGG.
Sewing Machine.

No. 36,074.  Patented Aug. 5, 1862.

4 Sheets—Sheet 4.

Witnesses:   Inventors:

UNITED STATES PATENT OFFICE.

C. O. CROSBY AND HENRY KELLOGG, OF NEW HAVEN, CONNECTICUT.

IMPROVEMENT IN MACHINES FOR PRODUCING FOLDED TRIMMINGS.

Specification forming part of Letters Patent No. 36,074, dated August 5, 1862.

*To all whom it may concern:*

Be it known that we, CHAUNCEY O. CROSBY and HENRY KELLOGG, of New Haven, Connecticut, have invented a new and useful Machine for Producing Folded Trimmings, such trimmings being applicable to many useful and ornamental purposes; and I do hereby declare that the following, taken in connection with the drawings, is a full, clear, and exact description thereof.

Figure 13:
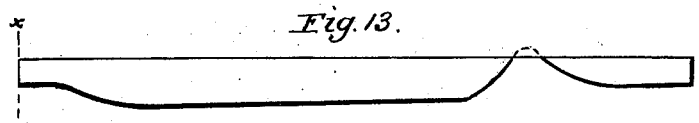
Figures 14, 15:
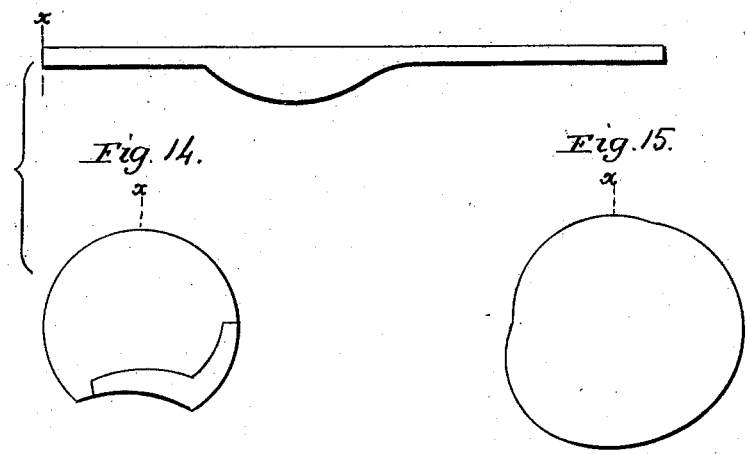
Figure 16:
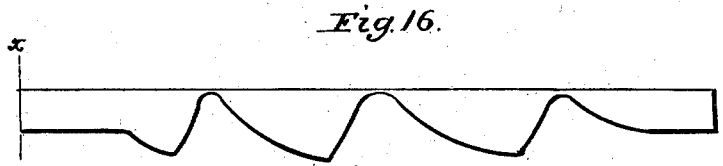
Figure 17:
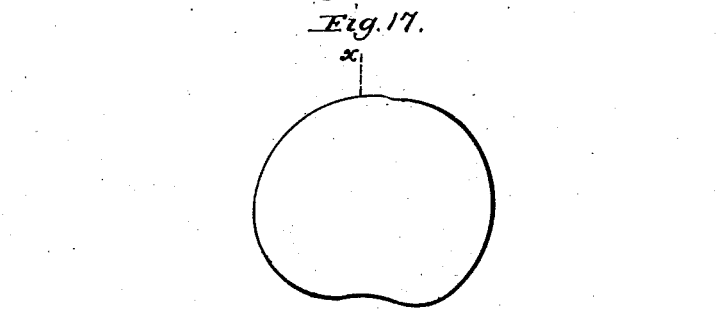
Figure 18:
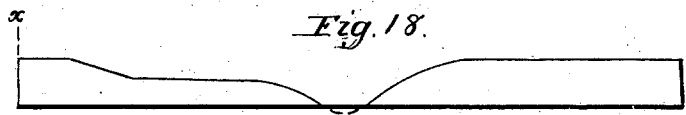

In the drawings, Figure 1 is a perspective view of the whole machine. Fig. 2 is a vertical section through the same from front to rear. Fig. 3 is a perspective detail of folding-blades, delivering apparatus, &c. Figs. 4 and 5 are details in perspective. Fig. 6 is a section through the discharging-jaws. Fig. 13 is a development on a plane surface of the cam $j^5$. Fig. 14 is a development of the cam $l^7$ and an elevation of the cam $l^6$, showing $l^7$ projecting from it. Fig. 15 is an elevation of cam $j^3$. Fig. 16 is a development of cam $e^3$. Fig. 17 is an elevation of cam $h^8$. Fig. 18 is a development of cam $h^4$, these plans and developments being full size, and the point marked $x$ upon them all being in the same plane passing through the shaft upon which they are all mounted; and the other figures are of details of the machine or representations of the product thereof, which will be referred to hereinafter.

The material to be acted upon by the machine is tape, braid, and similar articles, or thin narrow strips of vegetable fiber, and the machine folds such strips so as to resemble gimp or plaiting, and sews the folds down so as to preserve the folding given by the machine.

The machine consists, essentially, of a delivering or introducing apparatus, a folding apparatus, a stitching mechanism, and a discharging apparatus, and in its most perfect form also contains an assistant folder or preparer; and the nature of our invention consists in combining these sets of apparatus or mechanism into a complete machine; and, also, in various sub-combinations thereof which perform certain operations upon the material being acted upon; and, also, in certain peculiarities of construction of parts of apparatus, substantially such as are hereinafter described.

The machine herein described, which embodies our invention, is mounted on a table, $a\ a\ a$, which supports journals for the main shaft $b$, and a bed-plate, $c$, which supports the various carriages, guide-blocks, levers, &c. The movements of all parts of the machine are derived from the main shaft by the aid of cams, eccentrics, and cog-wheels.

The tape or braid to be folded is mounted upon a reel, $d$, attached to a tube, $d'$, which is free to turn on journals carried by a standard, $x$, secured to the bed-plate. This tube has secured upon it a ratchet-wheel, $d^2$, and attached to its lower end a mouth-piece, which consists of a metallic gutter, $d^4$, with a spring, $d^3$, pressing into the bottom of the same. The spring and the gutter-piece are attached to a block, $d^5$, which is pivoted at $d^6$ to the tube. This block is slotted, and tape can pass from the reel down through the tube, thence through the slot in the block, and finally out between the gutter-piece and the spring, the latter making a slight resistance to the delivery of the tape. The mouth-piece, as a whole, can be canted upon the axis of the block, so as to convey the tape it is delivering away from the axial line of the tube, and this canting motion is derived from a stationary cam, $d^7$, (shown in detail in Fig. 7,) the protuberances of which act upon arms $d^8$, attached to or making part of the slotted block $d^5$. In the precise machine described this tube is to receive an interrupted revolving motion, which is imparted to it by means of a ratchet or dog, $e$, mounted on a lever, $e'$, pivoted at $e^2$. The tail of this lever is forced to vibrate by the combined agency of a cam, $e^3$, (see Figs. 16 and 19,) and a spring attached to the lever and to any convenient stationary part of the machine, the spring forcing the lever against the cam. This spring, in order to avoid complexity, is not represented in the drawings. As thus far described, the tape-reel would receive an interrupted rotating motion; but as it is heavy (when loaded with tape) we find that it is more advantageous to apply the bobbin-collar $f^3$ loosely upon the tube, to attach to the collar a small cog-wheel, $f'$, (see Fig. 5,) and to cause this wheel to revolve uninterruptedly by another wheel, $f'$, on a shaft, $f^2$, which latter is by means of proper cog-gearing to receive motion from the main shaft. The cogs must be so proportioned that the collar makes turn for turn with the tube, so that both the reel and the tube make the same number of revolutions per minute. When the cog-gearing is employed, the delivering apparatus moves uninterruptedly, or without the alternate stopping and starting due to the action of a ratchet and pawl; but even when it is so moved the assistant folder is still to be actuated in substantially the manner before described. This revolving of the bobbin or reel upon the axis of the tube is to prevent the tape from twisting as it is folded, and the canting and revolving motion of the mouth-piece is to aid in folding the tape, or, in other words, to prepare it for folding; and the mouth-piece, moving substantially as described, is the assistant folder, while the reel revolving on an axis other than its own, so as to deliver the tape without a twist or to take out turns that are put in the tape by the folding apparatus, is the delivering or introducing apparatus.

Below the mouth-piece lies the folding apparatus, which in the present machine consists of three folding-blades, 1, 2, and 3. These blades are made of thin, smooth sheet metal, and blade 2 is attached to a slide, $g$, moving in proper guides in the bed-plate. Its farther end $g^2$ may be provided with a friction-roller, which, by means of a spring, $g^4$, attached to the slide and some stationary part of the machine, is caused to press against a cam, $g^3$, (see Fig. 8,) upon the main shaft. A revolution of the shaft will therefore cause the folder to reciprocate. This folder is springy or attached to its slide by a spring-connection, and has brazed or otherwise attached to it a wire or rod, $g^5$. Alongside of the slide, and secured to the table, is a cam or wedge, $g^6$, having its thin edge pointing toward the main shaft. By means of this rod and wedge the blade 2 is lifted as it recedes backward and near the end of its backward motion, and by "backward" we mean away from the mouth-piece. The blade 1 is also metallic and springy, and is attached to a stock, $h$, to which is pivoted a lever, $h'$. This lever is pivoted upon a projection, $h^2$, from a slide, $h^3$, and the end of the lever rests against a cam, $h^4$, (see Fig. 9 for detail,) being pressed thereon by a spring, $h^5$. The stock $h$ slides in ways in a carriage, $h^6$, and this carriage is guided by rods $h^7$ entering proper guide-blocks, the rods and the carriage being attached to the sliding bar $h^3$. This bar has on its end a friction-roller, which is forced into contact with the cam $h^8$ by a spring, $h^9$. Now, the object of this arrangement is as follows, viz: that the folder may move in any necessary direction—sidewise, endwise, or diagonally, it being moved endwise through the agency of the lever, sidewise by the slide or bar $h^3$, and diagonally by a motion of both at the same time; and the folder 3 is mounted in substantially the same manner, and both folders may, by a proper shape and adjustment of cams, have imparted to them any required length of motion in any desired direction at such time as shall be necessary to co-operate with other motions of the machine. This folder 1 has attached to its upper surface a rod, $h^{10}$, which slides at times over a wedge, $h^{11}$, the operation of the two being to lift the folder as it advances toward the mouth-piece.

Another blade, 3, is mounted on a stock, $j$, which can slide to and fro in a carriage, $j'$. The carriage is guided by rods and moved by a sliding rod, $j^2$, provided with a friction-roller resting against a cam, $j^3$. (See Fig. 10 for detail.) A spring similar to $h^9$ causes the roller to press against the cam. The stock has pivoted to it a lever, $j^4$, which is centered upon a projection from the sliding rod $j^2$, and the end of this lever abuts against a cam, $j^5$, being pressed against the cam by a spring arranged and acting like $h^5$. This folder has also attached to it a rod, $j^6$, which, in connection with a stationary wedge, $j^7$, causes the folder to lift at a certain part of its advancing motion. By means of the cams and attachments this folder is caused to move in directions and through distances as required in a similar manner to folder 1. The folder 1 has a projection from its upper surface at $y$, the folder 2 at $u$, and the folder 3 at $z$. These projections are surfaces at right angles, or nearly so, with the surfaces of the folders. These folders, having motions, substantially as hereinafter specified, to fold tape, braid, &c., constitute the folding apparatus.

The stitching mechanism consists in part of a needle, $k$, attached to an arm, $k'$, which is mounted on a rock-shaft and moved by an eccentric-rod, $k^2$, receiving motion from an eccentric on the main shaft, (see specially Figs. 2 and 11,) and in part of a rotating hook, $k^3$, (see specially Figs. 2 and 12,) which is mounted on a shaft provided with a bevel-wheel and forced to revolve by another bevel-wheel keyed upon the main shaft. The needle descends through the tape after it is folded, and its loop is seized by the rotating hook. Proper spools for threads and tensions are to be provided. The apparatus specially represented is like that now well known as the "Willcox & Gibbs sewing-machine;" but any sewing mechanism, of which there are now many well-known varieties, may be substituted for that represented, so long as so arranged as to fasten together the folds as made by the folding apparatus. We prefer, however, sewing mechanism which makes a crochet or single-thread loop-stitch.

The discharging apparatus has two functions—the one in conjunction with the folding apparatus to advance the folded tape to be sewed, the other to carry the sewed and folded tape out of the machine. It consists, essentially, of two surfaces, $l\ l'$, which at times grip the folded tape between them. Both of these surfaces are slotted along their centers, so as to permit of the action of a spring, $m$, and a stationary surface, $n$. The surface $n$ is fastened to the bed-plate. The surface $l'$ surrounds it, and is free to slide in ways or a slot in the bed-plate. The spring $m$ enters the slot in $l$ and rests upon the surface $n$, so that it can grip tape against $n$. The surface $l'$ has projecting from it two pins, (see Fig. 1,) and the surface $l$ is provided with another pin, which enters between the two former ones. The surface $l$ is attached by a pivot to an arm, $l^2$, pivoted at $l^3$ to a standard, $l^4$, which is free to oscillate. The end of the arm $l^2$ has secured to it a pin, $l^5$. This pin rests against a face-cam, $l^7$, and the end of the lever rests upon a cam, $l^6$. A spring, $l^8$, causes both the pin and the end of the arm to bear against their respective cams. The cam $l^6$ acts to raise and depress the upper surface. The cam $l^7$ acts to move both surfaces in the line of discharge. (See Figs. 14 and 20.) The action of the whole apparatus is as follows: When the two surfaces are in contact they grasp the folded tape. When $l$ moves away from the folding apparatus, it, by means of the pins, carries $l'$ with it, and both, grasping the folded tape, carry it past the needle and out of the machine. Then $l$ rises and the tape is held at rest by the spring compressing it against the stationary surface $n$. When $l$ moves toward the folding apparatus, it carries $l'$ with it, and then descends, so as to grasp tape again between itself and $l'$. $l$ and $l'$ act like pincher-jaws, to seize and release and carry along the article which has been seized. $m$ and $n$ act to hold an article at rest while the pincher-jaws are separated and moving to take a new hold. It is necessary, therefore, that the grasp of the spring should be less forcible than that of the pincher-jaws. The motions of the discharging apparatus must, by proper shape and adjustment of cams, be of suitable length and so timed as to work in proper concert with the folders and draw the tape along when the needle is out of it.

In working with the machine, tape is to be wound upon the reel, led down through the tube and the mouth-piece, and may then be carried under folder 2, between it and folder 3, under 3, and between it and 1, then under folder 1, and so out under the needle and under the spring $m$. Fig. 3 represents the parts in this position. The first motion of the machine will then turn the mouth-piece and cant it, so as to draw the tape over the folding-edge of the folder 2. Folder 1 will now back diagonally out from under the folded tape, in such a curve that $h^{10}$ in so doing does not touch $h^{11}$, and will then advance again. In so doing its rod will ride over the wedge, which will lift the folder so that it rides over the tape and folds it down on top of folder 2, finally biting the tape firmly between its advancing edge and the projection $z$ on folder 3. The mouth-piece now turns again, the roller $d^8$, hindmost in Fig. 2, rides on top of the left-hand forward protuberance in $d^7$, (see $s$, Fig. 7,) and the mouth-piece is so canted as to draw the tape from the folding-edge of 1 directly toward its stock. Folder 3 now retreats out from under the tape and advances again. In so doing it rises by its rod riding over wedge $j^7$. As it comes over the tape it folds it down on top of folder 1. Folder 2 now retreats and rises by its rod rising over its wedge, and when it has done so, folders 1 and 3, clasping the folded tape, (such clasping being aided by the edge of 3 striking tape against $z$,) advance together in the direction of motion of the discharging apparatus. The movable jaws of this apparatus move at the same time and in the same direction, carrying folded tape under the needle and out of the machine. The tube now turns again, the roller $d^8$, foremost in Fig. 3, rides on top of the protuberance $t$ (see Fig. 7) on $d^7$, and the mouth-piece cants rearward, so as to draw tape over the diagonal edge of 3, which is nearest the front of the machine. Folder 2, being now high enough to override the tape, then advances over the tape, folds it down upon 3, and nips it against the projection $y$. While this is doing the needle has descended and, aided by the hook, taken a stitch in the folds to hold them in place, and the upper discharging-jaw has lifted, relaxed its grasp on the tape, moved in a direction contrary to that of discharge, carrying the lower jaw with it, and has descended again so as to take a fresh hold of the folded tape. While both the jaws were moving in this reverse direction the folded tape has been held at rest by the spring $m$. Folder 1 now retreats again, the mouth-piece again cants so as to draw tape over the edge of folder 2, folder 1 advances, the mouth-piece cants, folder 3 retreats and advances, and so on as before described, making fold after fold.

The needle may retreat out of the tape at any convenient time when the tape is not in motion, and the cams must be so shaped as to give motions at times and in the directions as described, and it will be observed that the great principle of the folding apparatus is that each blade shall fold over the edge and surface of another, and that each folder shall retreat when lowest, and in its advance take the highest place. The springiness of the folders is important in this aspect, not only as permitting the folders to take the proper positions, but as enabling them always to press firmly upon the tape; but they might receive all their motions from cams. Cams shaped substantially as shown in the drawings will make a trimming like that shown in Fig. 21, and other shapes of cams will make other varieties of folds, Fig. 21 being a representation of the upper and under sides of the trimming, Fig. 22 being a representation of another variety of trimming, and Figs. 23 and 24 representing trimmings that can be made by certain alterations not affecting the principle of the machine; and these varieties may be added to by changing the number relative, position, and movement of folders.

Certain folds may be made without the canting motion of the mouth-piece and by a mere revolution of the tube, and tolerable work may be done without the projections from the surface of the folders; but, the best work we prefer to make the machine in all respects as described, and to take but one stitch in the folded goods for every motion of the discharger; but more stitches may be taken, if desired. Our plan is to resew the folded trimming, after it has left the machine, with as great a number of stitches to the inch as may be desired, and then to rip or ravel out the seam put in by the machine; but this seam may, by a proper arrangement of parts, be made close and tight enough to do away with the need of subsequent sewing.

The things of importance in the machine are the parts and surfaces that act upon the tape or braid, &c. The cams, shafts, &c., for giving motion to these parts may be changed in shape, form, arrangement, and construction, or have other mechanism substituted for them to do their work, so long as there is machinery of some kind or other to move the acting parts properly.

We claim as of our own invention—

1. The combination of delivering apparatus, substantially such as described, with apparatus for folding, substantially such as is described.

2. In combination, a delivering apparatus, an assistant folder, and a folding apparatus, all substantially such as specified.

3. In combination, a folding apparatus, or a folding and an assistant folding contrivance, and a mechanism for stitching folds together, the combination being substantially such as described, and operating substantially as specified.

4. In combination, apparatus for making a fold, and apparatus for stitching, and apparatus for discharging, all substantially such as described and operating substantially as set forth.

5. In combination, a delivering apparatus, a folding apparatus, a stitching mechanism, and a discharging apparatus, all substantially such as described, and this we claim either with or without an assistant folder substantially such as described.

6. In a folding apparatus, the use of projections at right angles to the folders, or their equivalents, so that a moving folding-edge shall nip tape, braid, &c., between itself and such projections, so as to make a sharp fold, as described.

7. An assistant folder having an interrupted motion, in combination with a delivering apparatus having a continuous motion, as specified.

8. Folding-blades grasping folded material and moving at the same time and in the same direction with discharging apparatus grasping the same material, substantially as specified.

9. In combination with each other, folding-blades moving each over the other to form folds which are springy or are mounted on springs, so that they may change their relative level and press upon goods when folding them, substantially as specified.

In testimony whereof we have hereunto subscribed our names.

C. O. CROSBY.
HENRY KELLOGG.

In presence of—
L. G. PECK,
ALBERT SHERMAN.